(12) United States Patent
Yoon

(10) Patent No.: US 12,251,653 B2
(45) Date of Patent: Mar. 18, 2025

(54) MULTI-STRUCTURE FILTRATION DEVICE FOR FILTERING, SEPARATING, AND DEHYDRATING FOREIGN SUBSTANCES IN WATER

(71) Applicant: Essa Corp., Gyeongju-si (KR)

(72) Inventor: Youngnae Yoon, Gyeongju-si (KR)

( * ) Notice: Subject to any disclaimer, the term of this patent is extended or adjusted under 35 U.S.C. 154(b) by 504 days.

(21) Appl. No.: 17/633,267

(22) PCT Filed: Feb. 25, 2021

(86) PCT No.: PCT/KR2021/002423
§ 371 (c)(1),
(2) Date: Feb. 7, 2022

(87) PCT Pub. No.: WO2021/206290
PCT Pub. Date: Oct. 14, 2021

(65) Prior Publication Data
US 2022/0339564 A1    Oct. 27, 2022

(30) Foreign Application Priority Data
Apr. 10, 2020 (KR) .................. 10-2020-0044113

(51) Int. Cl.
| | | |
|---|---|---|
| *B01D 33/067* | (2006.01) | |
| *B01D 29/11* | (2006.01) | |
| *B01D 33/073* | (2006.01) | |
| *B01D 33/21* | (2006.01) | |
| *B01D 33/41* | (2006.01) | |
| *B01D 33/46* | (2006.01) | |
| *B01D 33/50* | (2006.01) | |
| *B01D 33/64* | (2006.01) | |
| *B01D 33/70* | (2006.01) | |
| *B01D 33/80* | (2006.01) | |
| *B01D 35/147* | (2006.01) | |
| *C02F 1/44* | (2023.01) | |

(52) U.S. Cl.
CPC .......... *B01D 33/067* (2013.01); *B01D 29/11* (2013.01); *B01D 33/073* (2013.01); *B01D 33/21* (2013.01); *B01D 33/41* (2013.01); *B01D 33/463* (2013.01); *B01D 33/50* (2013.01); *B01D 33/646* (2013.01); *B01D 33/70* (2013.01); *B01D 33/801* (2013.01); *B01D 33/804* (2013.01); *B01D 35/147* (2013.01); *C02F 1/44* (2013.01); *B01D 2201/081* (2013.01); *B01D 2201/089* (2013.01); *B01D 2201/188* (2013.01); *B01D 2201/282* (2013.01)

(58) Field of Classification Search
None
See application file for complete search history.

(56) References Cited

U.S. PATENT DOCUMENTS

| | | | |
|---|---|---|---|
| 6,942,786 B1 * | 9/2005 | Fosseng | B01D 33/056 210/393 |
| 10,011,355 B1 * | 7/2018 | Williams | B64D 11/04 |
| 10,112,131 B2 * | 10/2018 | Yoon | B01D 33/333 |
| 2015/0027960 A1 | 1/2015 | Hosler et al. | |
| 2018/0200649 A1 * | 7/2018 | Nagai | B01D 29/213 |

FOREIGN PATENT DOCUMENTS

| | | | | |
|---|---|---|---|---|
| CN | 204395590 U | * | 6/2015 | |
| CN | 110170202 A | * | 8/2019 | B01D 33/11 |
| KR | 10-0676751 B1 | | 2/2007 | |
| KR | 10-1089549 B1 | | 12/2011 | |
| KR | 10-1311872 B1 | | 10/2013 | |
| KR | 10-2016-0142755 A | | 12/2016 | |
| WO | 2009/041202 A1 | | 4/2009 | |

* cited by examiner

*Primary Examiner* — Ryan B Huang
*Assistant Examiner* — Tak L Chiu
(74) *Attorney, Agent, or Firm* — KORUS Patent, LLC; Seong Il Jeong

(57) ABSTRACT

The present invention provides a multi-structure filtration device for filtering, separating, and dehydrating foreign substances in water, the multi-structure filtration device comprising: a filtration tank filled with filtration target fluid inside; a filtration device unit having a cylindrical double drum structure, installed in the filtration tank so that a part of the filtration device unit is submerged in the filtration target fluid, and including two or more filters having different mesh sizes that are respectively wound on an inside and an outside of the filtration device unit, and one or more washing modules washing foreign substances attached to the filter wound on an outside of the filtration device unit. Accordingly, the multi-structure filtration device can have excellent filtration performance by double-filtering the target fluid using two or more filters, can operate in an eco-friendly manner by recycling filtered water and effectively washing the filters using the filtered water without separate chemicals, can increase the durability of the filters, and can reduce the washing and processing cost by reusing the filters.

5 Claims, 7 Drawing Sheets

Prior Art

MULTI-STRUCTURE FILTRATION DEVICE FOR FILTERING, SEPARATING, AND DEHYDRATING FOREIGN SUBSTANCES IN WATER

FIELD OF THE INVENTION

The present invention relates to a filtration device, and more particularly, to a device that filters large foreign substances in a first filter, separates fine foreign substances passing through the first filter in a second filter, transfers the separated foreign substances out of the water, and reduce the moisture content of the separated foreign substances through a dehydration device.

BACKGROUND OF THE INVENTION

In general, a filter is used to purify contaminated water, and comprises a porous membrane for separating the contaminated water into a solution and a solute. The filter is widely used in various water treatment devices such as a pure water manufacturing device, a water reclamation device, and a wastewater treatment device. In general, a flat-panel type filter operates by fixing a module including a plurality of filters to a frame and introducing contaminated water from the outside of the filter into the filter. However, as time passes, since these filters become polluted by contaminants, such as suspended solids, which are contained in the contaminated water and then attached to the membrane surface of the filter, the filter should be periodically replaced or cleaned through a chemical cleaning process or a reverse cleaning process.

As an example of a filter for purifying contaminated water, there is a Korean Registration Patent No. 10-2018-0070559 (2018.06.26). As schematically shown in FIG. 1, the patent discloses a vertical filter 2' including: an inlet pipe 6', a control valve 12', an outlet pipe 10' through which the processed contents are discharged by the control valve 12', and a house 4'. A plurality of filters are arranged to face each other in a plane direction, are spaced apart from each other in parallel, and have a structure in which contaminated water passes in the plane direction of the filter to remove contaminants such as suspended solids in the contaminated water. In this case, since the pressure is applied only in one direction and the suspended solids are attached to only one side of the filter, it is difficult to use the filter for a long period of time.

DETAILED DESCRIPTION OF THE INVENTION

Technical Problems

The object of the present invention is to provide a multi-structure filtration device that can efficiently filter target fluid by using two or more filters, can operate in an eco-friendly manner by repeating a filtration process and a backwashing process and using the washed filters consistently, and can minimize a decrease in filtration efficiency caused by clogging of the filters due to solid substances attached thereto. In addition, the object of the present invention is to provide a multi-structure filtration device that can transport foreign substances out of the water to minimize the moisture content of the foreign substances through the dehydration device and can be economically feasible by reducing the maintenance and filtration cost of the equipment.

SUMMARY OF THE INVENTION

To achieve the object mentioned above, the present invention comprises: a filtration tank filled with filtration target fluid inside; a filtration device unit having a cylindrical double drum structure, installed in the filtration tank so that a part of the filtration device unit is submerged in the filtration target fluid, and including two or more filters having different mesh sizes that are respectively wound on an inside and an outside of the filtration device unit, a first washing module transferring the filter wound on the outside of the filtration device unit on the ground and washing foreign substances attached to the filter; a driving gear transmitting power to the first washing module; a second washing module washing foreign substances attached to the filter wound on the inside of the filtration device unit; a discharging module provided in the filtration device unit and discharging floating foreign substances, which results from washing by the second washing module, to an outside, and a control module controlling operation states of the driving gear and the second washing module. The filters include a first filter provided in the outside of the filtration device unit and a second filter provided in the inside of the filtration device unit and having more mesh than the first filter. The control module operates the filtration device unit to double-filter foreign substances introduced into the filtration tank by collecting the foreign substances primarily through the filter wound on the outside of the filtration device unit and then secondarily through the filter wound on the inside of the filtration device unit. When a preset time period elapses from start time of filtration, the control module operates the first and the second washing module to wash the filters by removing and separating foreign substances attached to the filters. The foreign substances removed and separated by the second washing module are detached and guided to the filter wound on the outside of the filtration device unit through the discharging module. The washed filter is sent back to the filtration device unit, and the filtration and washing process are repeated.

The filtration device unit has a double structure including an outer wall in which a plurality of first support bars extending along a longitudinal direction of the filtration device unit are spaced apart from each other by a predetermined distance and an inner wall in which a plurality of second support bars extending along the longitudinal direction of the filtration device unit are spaced apart from each other by a predetermined distance. The outer wall and the inner wall are formed in cylindrical shapes with different sizes, respectively, a diameter Da of the outer wall is bigger than a diameter Db of the inner wall, Da>Db, the outer wall is formed to surround the inner wall at a predetermined distance, and the outer wall and the inner wall are configured to be rotatable on an imaginary center line formed along the longitudinal direction. The filtration device unit includes a first space part that is formed between the inner wall and the outer wall and a second space part that is formed inside the inner wall. The first filter is wound along the outer wall of the filtration device unit, and the second filter is wound along the inner wall of the filtration device unit.

The first washing module includes: an absorption roller transporting the first filter in a wound state and absorbing moisture contained in the foreign substances, a pressing roller formed to engage with the absorption roller and rotating in an opposite direction to a direction of transporting the first filter to remove and separate the foreign substances from the first filter, and a dehydration roller provided to press the absorption roller in a state of meeting with the absorption roller. The multi-structure filtration device further comprises an air jet nozzle that detaches the foreign substances dehydrated by the absorption roller from the first filter.

The second washing module includes: a washing water supply pipe connected and installed to supply washing water into the filtration device unit; a washing water supply pump supplying clean water double-filtered in the filtration device unit into the washing water supply pipe as the washing water; a washing nozzle washing the second filter by receiving the washing water from the washing water supply pipe and spraying the washing water from the second space toward the first space; the discharging module provided in the first space and discharging moisture from a mixture of the foreign substances of the second filter and the washing water sprayed from the washing nozzle, and a filtered water outlet hole formed in the second space and discharging filtered water that completes filtration through the first filter and the second filter and is accommodated in the second space. In addition, the multi-structure filtration device discharges the foreign substances to the outside of the filtration tank through the discharge module. The discharge module includes: a water outlet hole formed at one end of the filtration device unit; a check valve type water outlet unit provided to open and close the water outlet hole, and a water outlet pipe that is connected to the check valve type water outlet unit and discharges water come through the check valve type water outlet unit to the outside of the filtration tank. The check valve type water outlet unit controls the flow of the filtration target fluid in one direction to prevent the filtration target fluid filled in the filtration tank from flowing back into the second space.

The absorption roller has a plurality of protrusions formed on an outer circumferential surface thereof. The protrusion has a cylindrical or protruding shape, and a valley having a predetermined curve is formed between the protrusions. In addition, viewed from a side, the protrusion has a smooth curved end and is formed to extend along the longitudinal direction of the absorption roller.

The multi-structure filtration device further comprises: a foreign substance receiving unit separating and removing large solids and non-decomposable substances separated and removed from the first filter in a dehydrated state, and a dehydration support unit transferring dehydration liquid, which is obtained from the foreign substances attached to the first filter, to the filtration tank. The dehydration support unit is provided under the dehydration roller, and the dehydration liquid falls and moves to the dehydration support unit by gravity.

The foreign substance receiving unit is a drawer-type container that is slidably installed on an upper part of a storage space to be inserted and pulled out, and the foreign substances dehydrated by the dehydration roller naturally falls and moves to the foreign substance receiving unit by gravity. In addition, the present invention includes at least one tension control roller 230 provided between the filtration device unit 200 and the first washing module 300. The tension control roller 230 applies pressure to the first filter 11 to prevent the first filter 11 from sagging. In addition, according to another embodiment of the present invention, the multi-structure filtration device further comprises: the air jet nozzle 360 provided between the pressing roller 310 and the tension control roller 230. Furthermore, the pressing roller and the dehydration roller rotates by receiving the rotational force of the driving gear through the absorption roller, which is in contact with the pressing roller and the dehydration roller. The driving gear, the pressing roller, and the dehydration roller are spaced apart from each other by a predetermined distance or more and are positioned parallel to each other. The control module may include an emergency control button for manually applying and cutting off current, or enabling rotation and reverse rotation of the driving gear and the second washing module.

In addition, the present invention comprises: a filtration tank filled with filtration target fluid inside; a filtration device unit having a cylindrical double drum structure, installed in the filtration tank so that a part of the filtration device unit is submerged in the filtration target fluid, and including two or more filters having different mesh sizes that are respectively wound on an inside and an outside of the filtration device unit, a first washing module transferring the filter wound on the outside of the filtration device unit on the ground and washing foreign substances attached to the filter; a driving gear transmitting power to the first washing module; a second washing module washing foreign substances attached to the filter wound on the inside of the filtration device unit; a discharging module provided in the filtration device unit and discharging floating foreign substances, which results from washing by the second washing module, to the filter wound on the outside of the filtration device unit, and a control module controlling operation states of the driving gear and the second washing module. The filters include a first filter provided in the outside of the filtration device unit and a second filter provided in the inside of the filtration device unit and having more mesh than the first filter. The control module operates the filtration device unit to double-filter foreign substances introduced into the filtration tank by collecting the foreign substances primarily through the filter wound on the outside of the filtration device unit and then secondarily through the filter wound on the inside of the filtration device unit. When a preset time period elapses from start time of filtration, the control module operates the first and the second washing module to wash the filters by removing and separating foreign substances attached to the filters. The foreign substances removed and separated by the second washing module are detached and guided to the first filter wound on the outside of the filtration device unit through the discharging module. The first filter is transferred to the first washing module of the filtration device unit along with filtered foreign substances, and be filtered and washed.

The features and advantages of the present invention will become more apparent from the following detailed description in conjunction with the accompanying drawings.

TECHNICAL EFFECTS OF THE INVENTION

The multi-structure filtration device according to the present invention has excellent filtration performance by filtering the target fluid multiple times using two or more filters. In addition, the multi-structure filtration device according to the present invention is eco-friendly by sequentially washing and recycling the filters required for the filtration process. Furthermore, the multi-structure filtration device according to the present invention can reduce the processing cost, can minimize the deterioration of durability of the filters during the washing process, and can effectively discharge the foreign substances filtered through the filters by transporting the foreign substances out of the water and minimizing the moisture content of the foreign substances through the dehydration device.

BEST MODE FOR THE INVENTION

Figure 1:
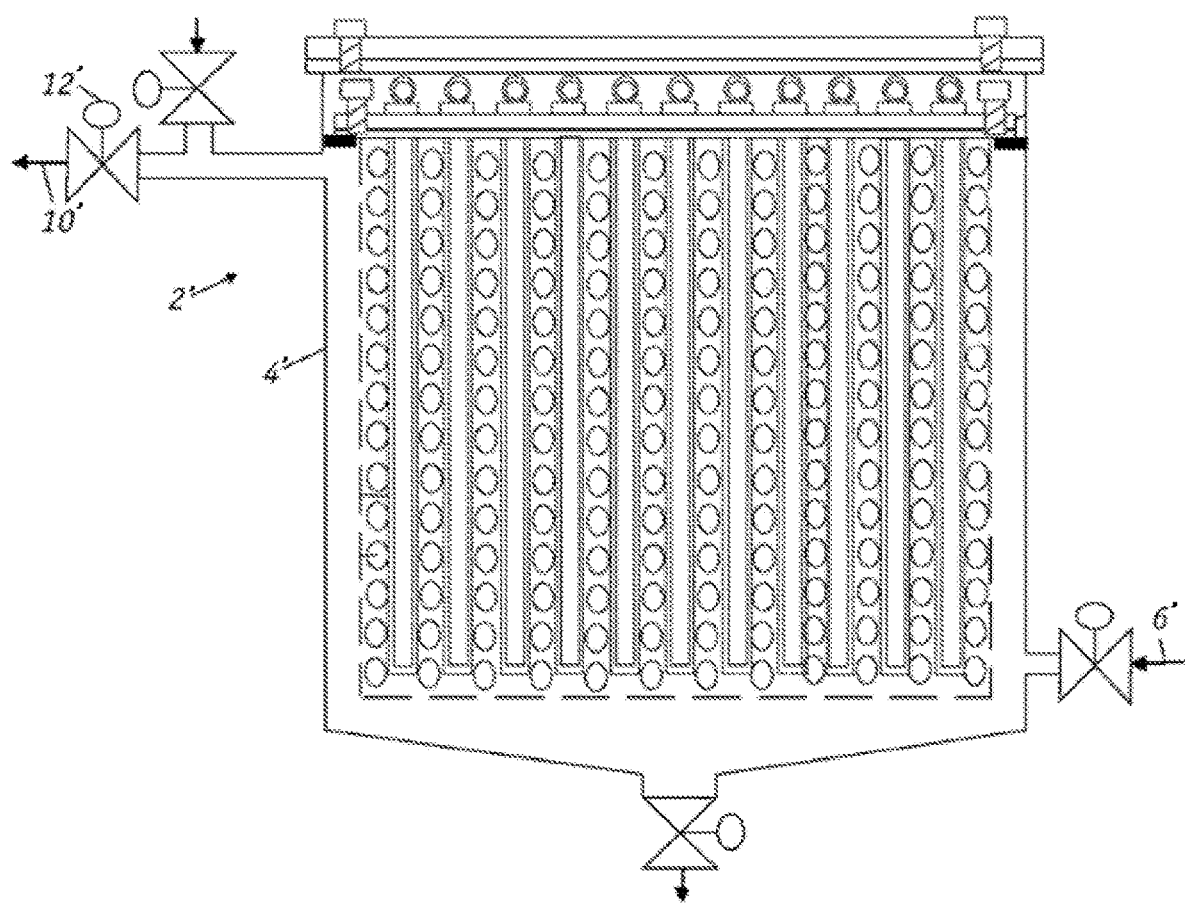
FIG. 1 is a drawing illustrating a structure of prior arts.

Hereinafter, preferred embodiments of the present invention will be described with reference to the accompanying drawings. In this case, the thickness of lines or the size of components shown in the drawings may be exaggerated for clarity and convenience of explanation.

In addition, the terms described later are defined in consideration of functions in the present invention, which may vary according to the intention or custom of the user or operator. Therefore, definitions of these terms should be construed based on the specification.

Furthermore, the embodiments described below do not limit the scope of the present invention, but are merely examples of the components presented in the appended claims of the present invention. In addition, embodiments that are included in the technical spirit of the specification of the present invention and that include substitutable components as equivalents in the components of the appended claims can be included in the scope of the present invention.

Figure 2B:
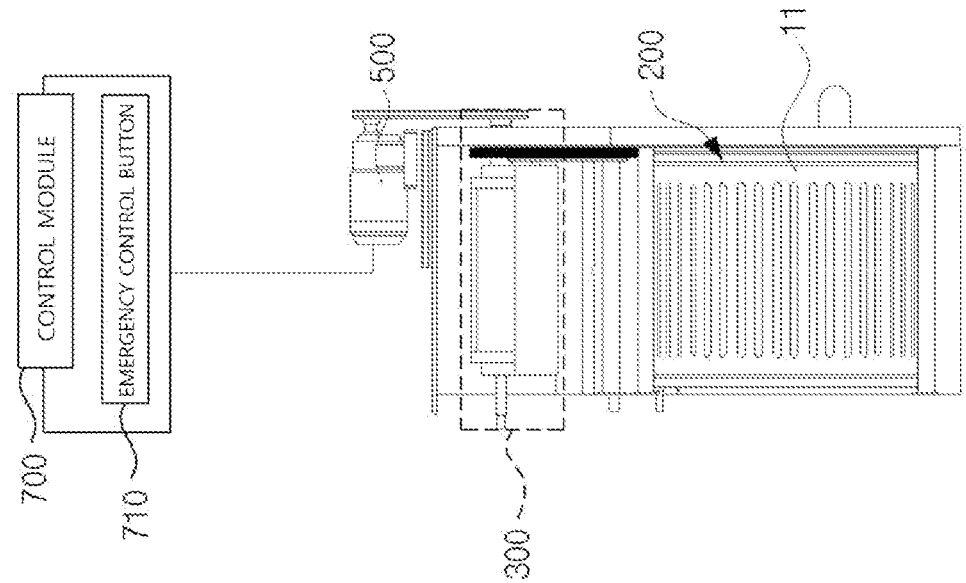
FIGS. 2A and 2B are side views illustrating a multi-structure filtration device for filtering, separating, and dehydrating foreign substances in water according to the present invention.
Figure 2A:
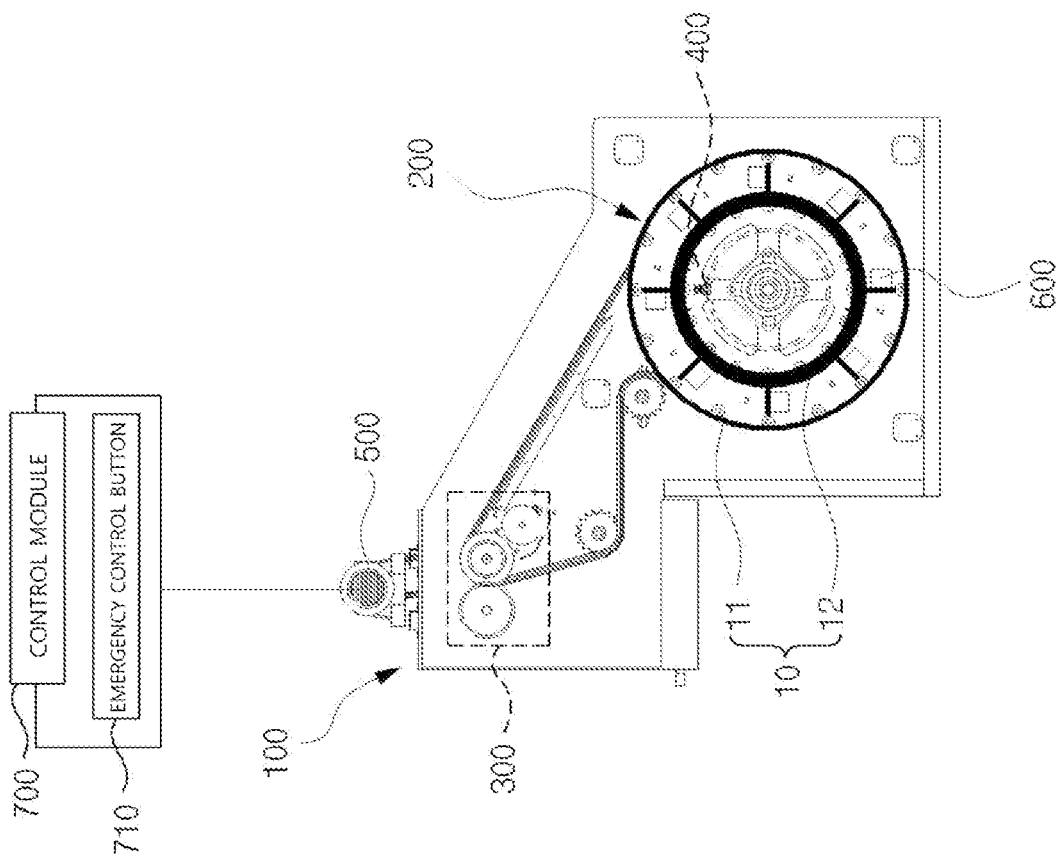

FIGS. 2A and 2B are is a side views illustrating a multi-structure filtration device for filtering, separating, and dehydrating foreign substances in water according to the present invention.

Referring to FIGS. 2A and 2B, the multi-structure filtration device comprises: a filtration tank 100 filled with filtration target fluid inside; a filtration device unit 200 having a cylindrical double drum structure, installed in the filtration tank 100 so that a part of the filtration device unit 200 is submerged in the filtration target fluid, and including two or more filters 10 having different mesh sizes that are respectively wound on an inside and an outside of the filtration device unit 200; a first washing module 300 transferring the filter 10 wound on the outside of the filtration device unit 200 on the ground and washing foreign substances attached to the filter 10; a driving gear 500 transmitting power to the first washing module 300; a second washing module 400 washing foreign substances attached to the filter 10 wound on the inside of the filtration device unit 200; a discharging module 600 provided in the filtration device unit 200 and discharging floating foreign substances, which are generated while washing by the second washing module 400, to an outside, and a control module 700 controlling operation states of the driving gear 500 and the second washing module 400. In addition, the filters 10 include a first filter 11 provided in the outside of the filtration device unit 200 and a second filter 12 provided in the inside of the filtration device unit 200 and having more mesh than the first filter 11. According to the embodiment, it is preferred that the first filter 11 has 50 to 150 mesh, and the second filter 12 has 200 to 550 mesh. Preferably, the first filter 11 is formed to have 100 mesh, and the second filter 12 is formed to have 500 mesh. The control module 700 may include an emergency control button 710 for manually applying and cutting off current, or enabling rotation and reverse rotation of the driving gear 500 and the second washing module 400.

Figure 3:
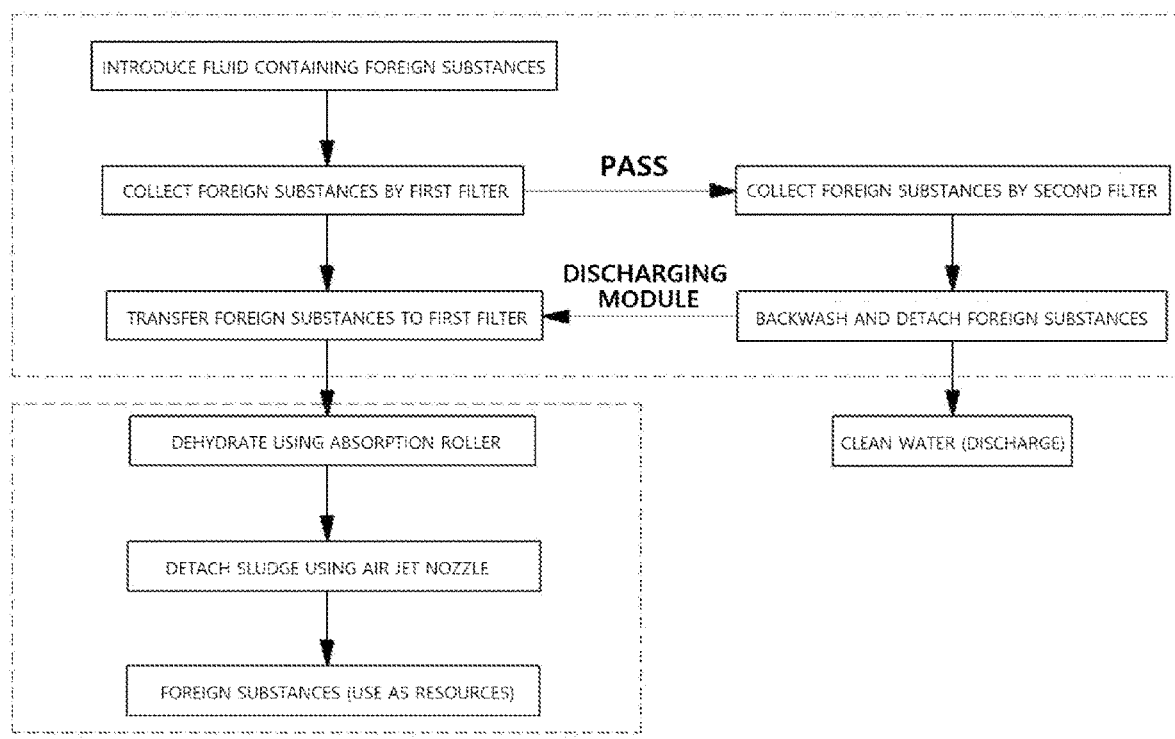
FIG. 3 is a flowchart illustrating an operation state of a control module according to the present invention.

FIG. 3 is a flowchart illustrating an operation state of a control module according to the present invention.

Referring to FIGS. 2 and 3, the control module 700 operates the filtration device unit 200 to double-filter foreign substances using two or more filters 10. That is, the foreign substances are double-filtered while passing through the filter 10 wound on the outside of the filtration device unit 200 and through the filter 100 wound on the inside of the filtration device unit 200 in sequence. When a preset time period elapses from start time of filtration, the control module 700 operates the first and the second washing module 300 for a predetermined time period to wash the filters 10, by removing and separating the foreign substances attached to the filters 10. The foreign substances removed and separated through the second washing module 400 are detached and guided to the filter 10 wound on the outside of the filtration device unit 200 through the discharging module 600, and the washed filters 10 are transferred back to the filtration device unit 200 and repeat the filtration process and washing process.

Since the foreign substances that are guided to and filtered by the first filter 11, the filter 10 wound on the outside of the filtration device unit 200, are transferred along with the first filter 11, as the first filter 11 is washed and purified in the first washing module 300, the foreign substances is discharged to the outside. Foreign substances that are not filtered by the first filter 11 may float, but they are also filtered when the washing process above finishes and the filtration device operates again.

According to the structure described above, the present invention minimizes clogging of the filters q0 caused by adhesion of solid substances and decrease in filtration efficiency, thereby providing excellent filtration efficiency and improved durability and enabling long-term use. Furthermore, foreign substances that are removed and separated from the filters 10 and dehydrated can be recycled as resources of good quality.

Figure 4:
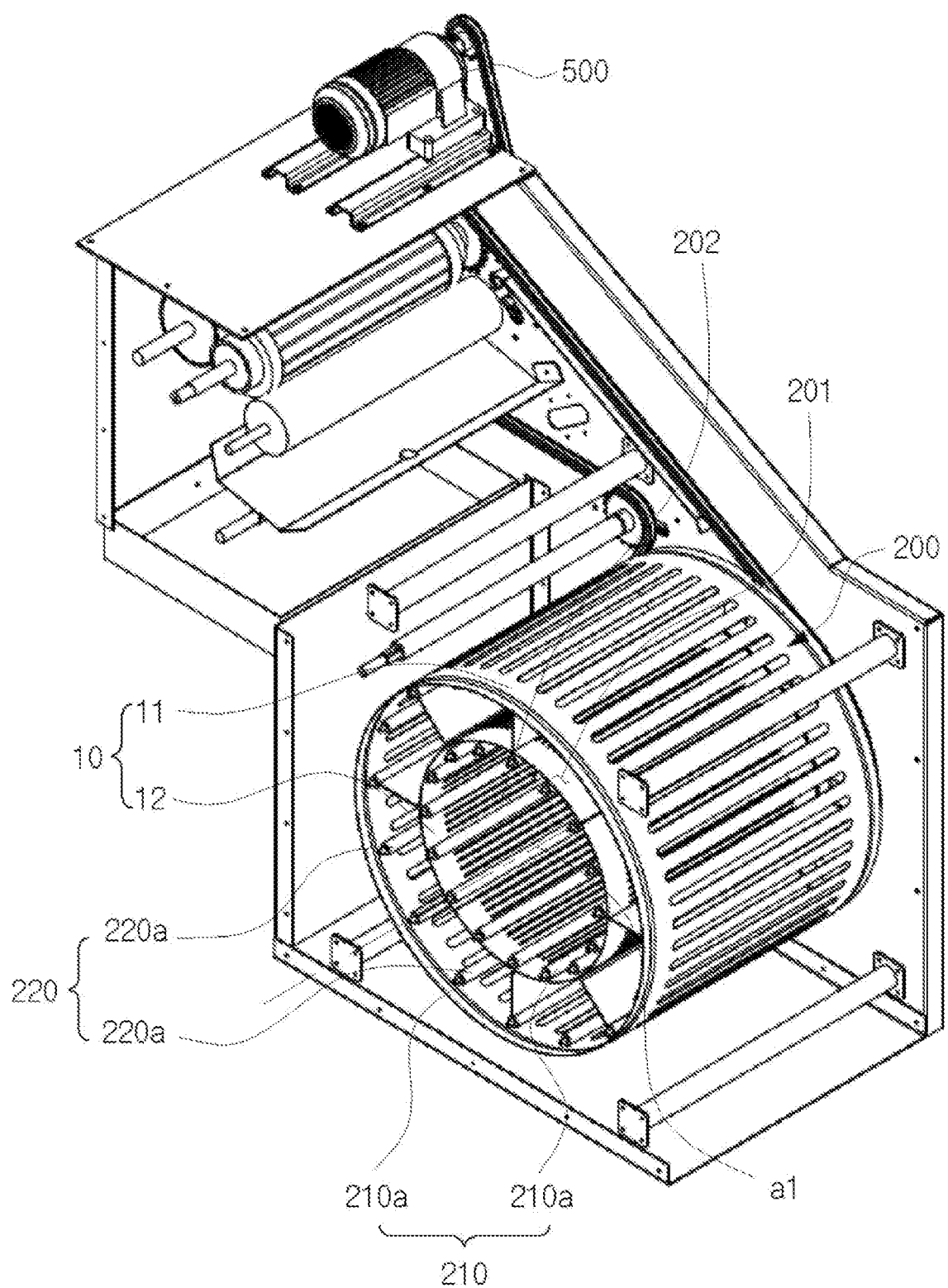
FIG. 4 is a perspective view illustrating a multi-structure filtration device for filtering, separating, and dehydrating foreign substances in water according to the present invention.

FIG. 4 is a perspective view illustrating the multi-structure filtration device for filtering, separating, and dehydrating foreign substances in water according to the present invention.

Referring to FIG. 4, the filtration device unit 200 has a double structure including: an outer wall 220 in which a plurality of first support bars 220a extending along a longitudinal direction of the filtration device unit 200 are spaced apart from each other by a predetermined distance, and an inner wall 210 in which a plurality of second support bars 210a extending along the longitudinal direction of the filtration device unit 200 are spaced apart from each other by a predetermined distance. The outer wall 220 and the inner wall 210 are formed in cylindrical shapes with different sizes, respectively. In this case, a diameter Da of the outer wall is bigger than a diameter Db of the inner wall, Da>Db, and the outer wall 220 is formed to surround the inner wall 210 at a predetermined distance. The outer wall 220 and the inner wall 210 are configured to be rotatable on an imaginary center line a1 formed along the longitudinal direction. The filtration device unit 200 includes: a first space part 201 that is formed between the inner wall 210 and the outer wall 220, and a second space part 202 that is formed inside the inner wall 210. The first filter 11 is wound along the outer wall 220 of the filtration device unit 200, and the second filter 12 is wound along the inner wall 210 of the filtration device unit 200.

Figure 5:
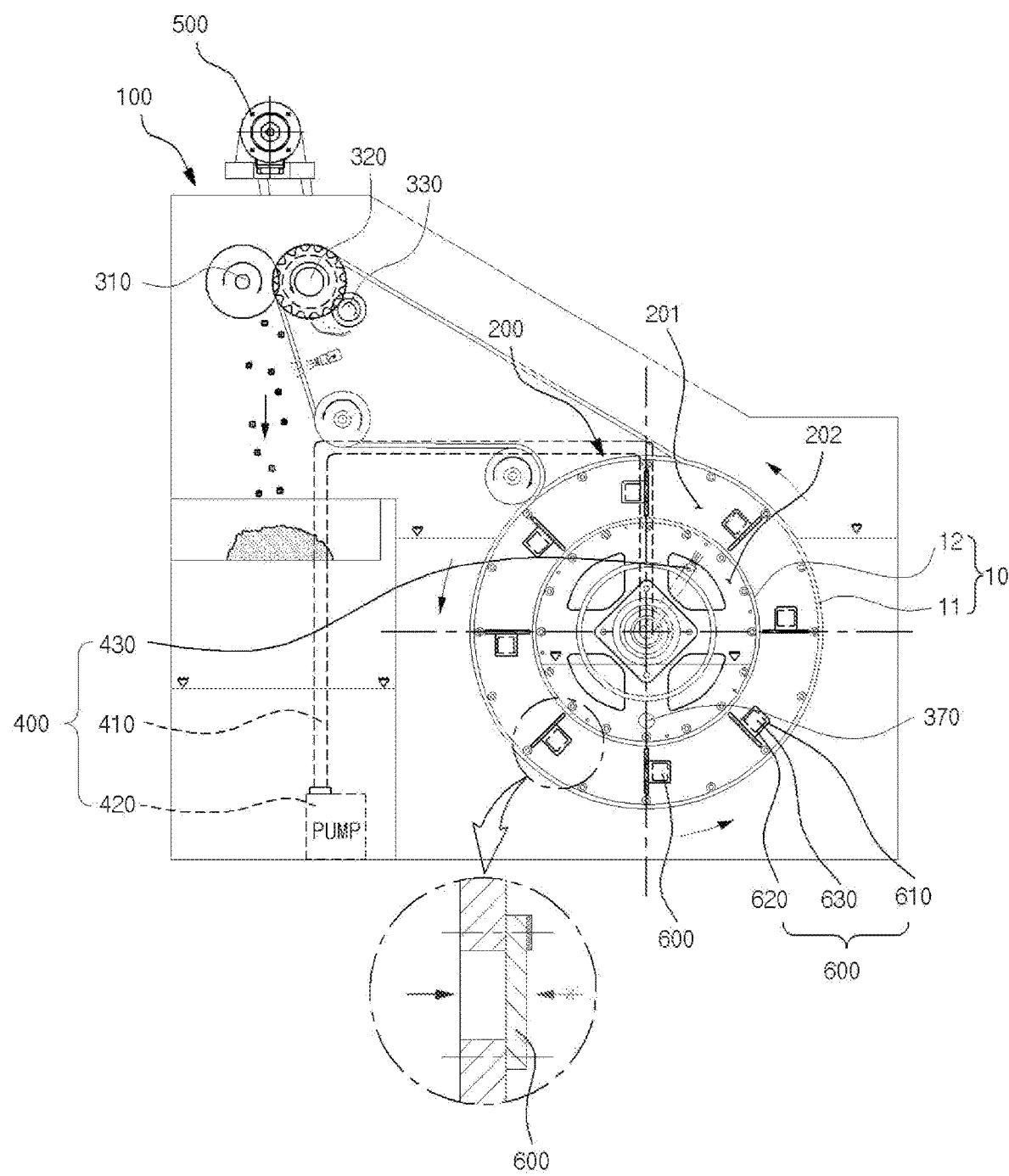
FIG. 5 is a side view schematically illustrating a state in which a second filter is washed by using a second washing module according to the present invention.

FIG. 5 is a side view schematically illustrating a state in which the second filter is washed by using the second washing module and foreign substances generated during the washing process are discharged according to the present invention.

Referring to FIG. 5, the second washing module 400 of the present invention will be described in detail. The second washing module 400 includes: a washing water supply pipe 410 connected and installed to supply washing water into the filtration device unit 200; a washing water supply pump 420 supplying clean water double-filtered in the filtration device unit 200 into the washing water supply pipe 410 as the washing water; a washing nozzle 430 washing the second filter 12 by receiving the washing water from the washing water supply pipe 410 and spraying the washing water from the second space 202 toward the first space 201; the discharging module 600 provided in the first space 201 and discharging moisture from a mixture of the foreign substances of the second filter 12 and the washing water sprayed from the washing nozzle 430, and a filtered water outlet hole 370 formed in the second space 202 and discharging filtered water that completes filtration through the first filter 11 and the second filter 12 and is accommodated in the second space 202. The filtered water outlet hole 370 is formed on one side of both sides, which is perpendicular to the inner wall 210, of the second washing module 400. According to the structure described above, the multi-structure filtration device of the present invention discharges the foreign substances to the outside of the filtration tank 100 through the discharge module 600. The discharge module 600 includes a water outlet hole 630 formed at one end of the filtration device unit 200 and a check valve type water outlet unit 610 provided to open and close the water outlet hole 630. According to an embodiment, the discharge module 600 may further include a water outlet pipe 620 that is connected to the check valve type water outlet unit 610 and discharges water come through the check valve type water outlet unit 610 to the outside of the filtration tank 100. The check valve type water outlet 610 controls the flow of the filtration target fluid in one direction to prevent the filtration target fluid filled in the filtration tank 100 from flowing back into the second space 202.

Figure 6:
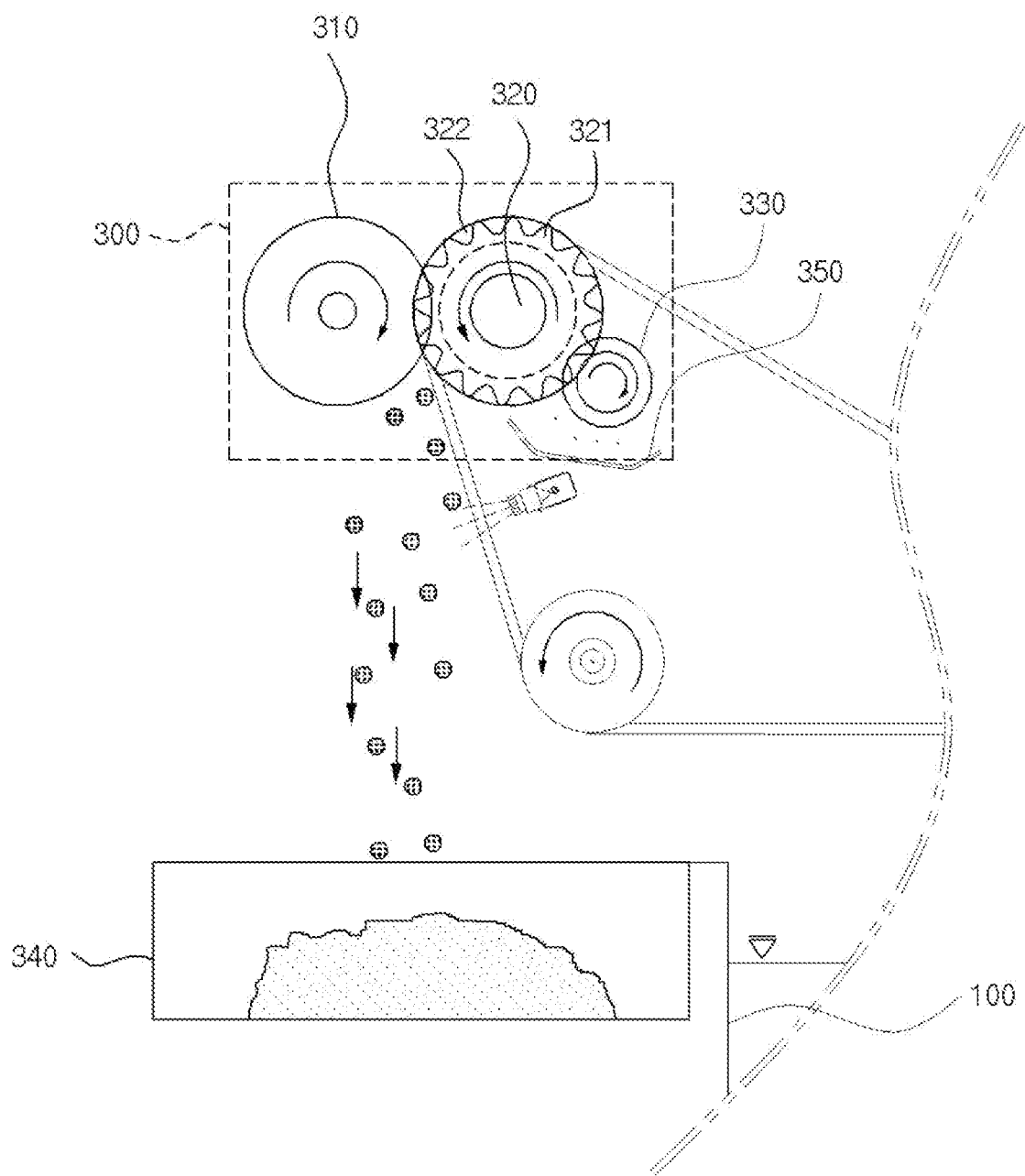
FIG. 6 is a side view schematically illustrating a state in which a first filter is washed by separating and discharging foreign substances attached to the first filter by using a first washing module according to the present invention.

FIG. 6 is a side view schematically illustrating a state in which the first filter is washed by separating and discharging foreign substances attached to the first filter by using the first washing module according to the present invention.

Referring to FIG. 6, the first washing module 300 includes: an absorption roller 320 transporting the first filter 11 in a wound state and absorbing moisture contained in the foreign substances, a pressing roller 310 that is formed to engage with the absorption roller 320 and rotates in an opposite direction to a direction of transporting the first filter 11 to remove and separate the foreign substances from the first filter 11, and a dehydration roller 330 provided to press the absorption roller 320 in a state of meeting with the absorption roller 320. The dehydration roller 330 rotates in an opposite direction to a rotational direction of the absorption roller 320 to dehydrate moisture absorbed by the absorption roller 320. The water obtained from the dehydration process naturally moves downward by gravity. According to the structure described above, since the moisture content of the foreign substances becomes lower than the reference value by using the absorption roller 320, the separated foreign substances can be recycled as resources of good quality.

The absorption roller 320 has a plurality of protrusions 321 formed on an outer circumferential surface thereof. The protrusion 321 has a cylindrical or protruding shape and a valley 32st2 having a predetermined curve is formed between the protrusions 321. Viewed from the side, the protrusion 321 has a smooth curved end and is formed to extend along the longitudinal direction of the absorption roller 320. In addition, the driving gear 500, the pressing roller 310, and the dehydration roller 330 shown in FIG. 5 are spaced apart from each other by a predetermined distance or more and are positioned parallel to each other.

Furthermore, the multi-structure filtration device of the present invention further comprises: a foreign substance receiving unit 340 separating and removing large solids and non-decomposable substances separated and removed from the first filter 11 in a dehydrated state, and a dehydration support unit 350 transferring dehydration liquid, which is obtained from the foreign substances attached to the first filter 11, to the filtration tank 100. The dehydration support unit 350 is provided under the dehydration roller 330, and the dehydration liquid falls and moves to the dehydration support unit 350 by gravity. The dehydration support unit 350 serves to guide the falling dehydration liquid to move into the filtration tank 100. In order to guide the dehydration liquid into the filtration tank 100, it is desired that the dehydration support unit 350 is formed to have a predetermined slope.

The foreign substance receiving unit 340 is a drawer-type container that is slidably installed on an upper part of a storage space to be inserted and pulled out, and the foreign substances dehydrated by the dehydration roller 330 naturally falls and moves to the foreign substance receiving unit 340 by gravity. According to the structure described above, when a certain amount of foreign substances is accumulated in the foreign substance receiving unit 340, the foreign substance receiving unit 340 is pulled out by sliding it, and then the accumulated foreign substances can be easily discharged. Since the discharged foreign substances are in a state in which moisture has been removed, the discharged foreign substances can be recycled as resources of good quality.

According to the structure described above, the dehydration liquid flowing into the filtration tank 100 is in a state in which large solids and non-decomposable substances are removed. In this case, the multi-structure filtration device can further maximize water treatment efficiency by separating and removing dead microorganisms and large, old microorganisms in death phase from the dehydration liquid, returning only active microorganisms to the washing tank, and cultivating them.

Figure 7:
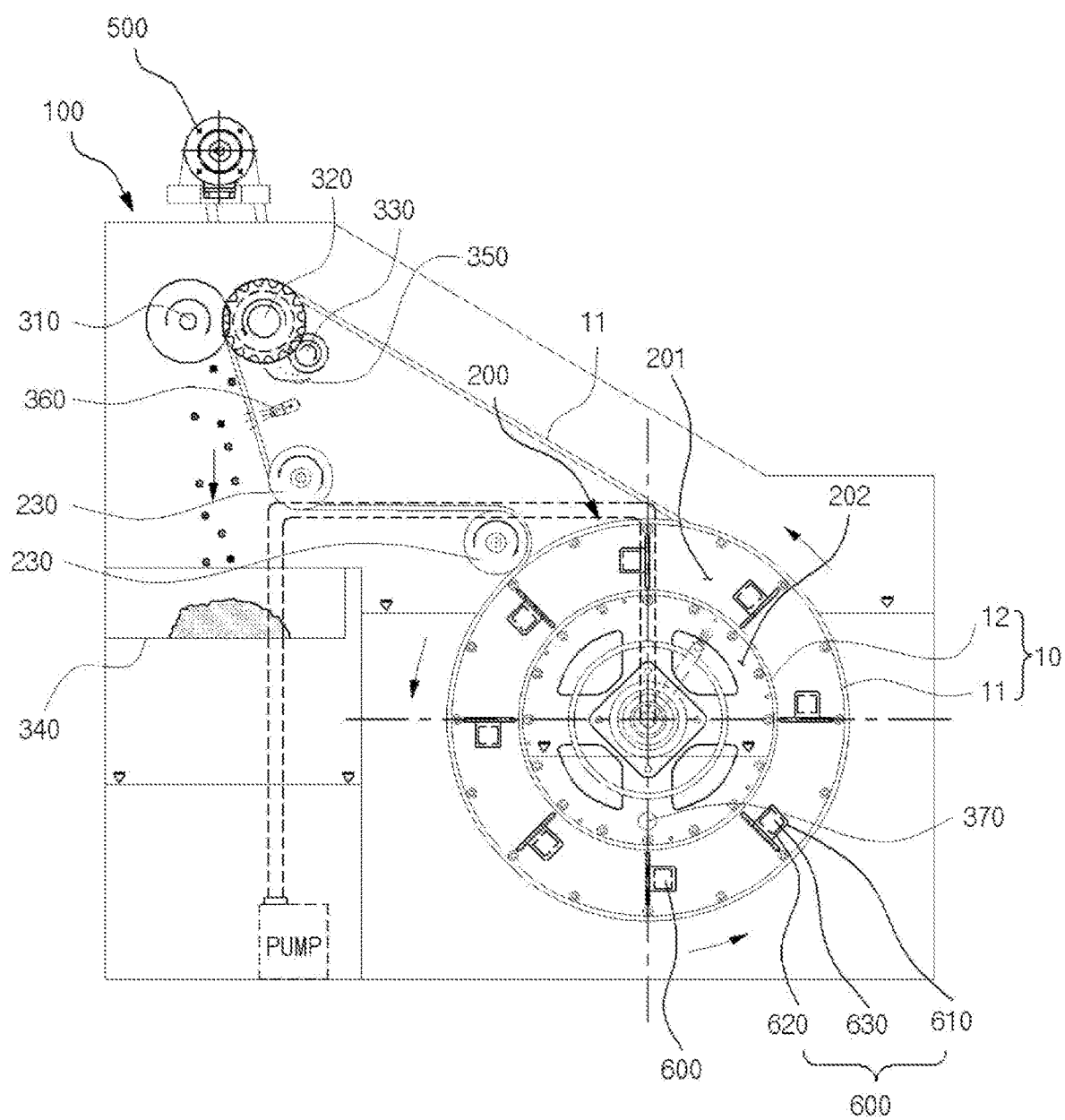
FIG. 7 is a partial detailed view illustrating a state in which the first filter is transferred to a pressing roller according to the present invention.

FIG. 7 is a partial detailed view illustrating a state in which the first filter is transferred to the pressing roller according to the present invention.

Referring to FIG. 7, the present invention includes at least one tension control roller 230 provided between the filtration device unit 200 and the first washing module 300. The tension control roller 230 applies pressure to the first filter 11 to prevent the first filter 11 from sagging. In addition, according to another embodiment of the present invention, the multi-structure filtration device further comprises: the air jet nozzle 360 provided between the pressing roller 310 and the tension control roller 230. As shown in FIG. 6, the air jet nozzle 360 dries the first filter 11 and removes fine-sized foreign substances adhered to the first filter 11. The air jet direction of the air jet nozzle 360 is provided to be toward the foreign substance receiving unit 340, and the foreign substance separated from the first filter 11 by the air jet nozzle 360 moves to the foreign substance receiving unit 340. The pressing roller 310 and the dehydration roller 330 rotates by receiving the rotational force of the driving gear 500 through the absorption roller 320, which is in contact with the pressing roller 310 and the dehydration roller 330.

Although the present invention has been described through specific embodiments, it is intended to describe the present invention in more detail, and the present invention is not limited thereto. It is apparent that modifications or improvements are possible by one of ordinary skill in the art within the technical spirit of the present invention.

All simple modifications and variations of the present invention fall within the scope of the present invention, and the specific scope of protection of the present invention will be determined clear by the appended claims.

What is claimed is:

1. A multi-structure filtration device for filtering, separating, and dehydrating foreign substances in water, the multi-structure filtration device comprising:
    a filtration tank filled with filtration target fluid inside;
    a filtration device unit having a cylindrical double drum structure, installed in the filtration tank so that a part of the filtration device unit is submerged in the filtration target fluid, and including a first filter and a second filter having different mesh sizes, the first filter being wound on an outside of the filtration device unit and the second filter being wound on an inside of the filtration device and having a finer mesh size than the first filter;
    a first washing module configured to transfer the first filter wound on the outside of the filtration device unit to an upper portion of the filtration tank outside of the filtration target fluid and configured to wash foreign substances attached to the first filter;
    a driving gear transmitting power to the first washing module;
    a second washing module configured to wash foreign substances attached to the second filter wound on the inside of the filtration device unit;
    a discharging module provided in the filtration device unit and configured to discharge floating foreign substances, which are generated during washing by the second washing module, to the first filter wound on the outside of the filtration device unit; and
    a control module configured to control operation states of the driving gear and the second washing module,
    wherein the control module is configured to operate the filtration device unit to double-filter foreign substances introduced into the filtration tank by collecting the foreign substances primarily through the first filter wound on the outside of the filtration device unit and then secondarily through the second filter wound on the inside of the filtration device unit,
    wherein when a preset time period elapses from a start time of filtration, the control module is configured to operate the first and second washing modules to wash the first and second filters by removing and separating foreign substances attached to the first and second filters,
    wherein the foreign substances removed and separated by the second washing module are detached and guided to the first filter wound on the outside of the filtration device unit through the discharging module, and the first filter is transferred to the first washing module of the filtration device unit along with filtered foreign substances, and then is washed,
    wherein the first washing module includes:
    an absorption roller configured to transport the first filter in a wound state and to absorb moisture contained in the foreign substances;
    a pressing roller configured to engage with the absorption roller and rotate in an opposite direction to a direction of transporting the first filter to remove and separate the foreign substances from the first filter; and
    a dehydration roller configured to press the absorption roller in a state of meeting with the absorption roller,
    wherein the absorption roller has a plurality of protrusions formed on an outer circumferential surface thereof, wherein the protrusion has a cylindrical or protruding shape, and a valley having a predetermined curve is formed between the protrusions,
    wherein when viewed from a side, the protrusion has a smooth curved end and is formed to extend along a longitudinal direction of the absorption roller.

2. The multi-structure filtration device of claim 1, wherein the filtration device unit has a double structure including an outer wall in which a plurality of first support bars extending along a longitudinal direction of the filtration device unit are spaced apart from each other by a predetermined distance, and an inner wall in which a plurality of second support bars extending along the longitudinal direction of the filtration device unit are spaced apart from each other by a predetermined distance,
    wherein the outer wall and the inner wall are formed in cylindrical shapes with different sizes, respectively, a diameter Da of the outer wall is greater than a diameter Db of the inner wall, Da>Db, the outer wall is formed to surround the inner wall at a predetermined distance, and the outer wall and the inner wall are configured to be rotatable on an imaginary center line formed along the longitudinal direction,
    wherein the filtration device unit includes a first space part formed between the inner wall and the outer wall and a second space part formed inside the inner wall, wherein the first filter is wound along the outer wall of the filtration device unit, and the second filter is wound along the inner wall of the filtration device unit,
    wherein the multi-structure filtration device further comprises an air jet nozzle that detaches the foreign substances dehydrated by the absorption roller from the first filter.

3. The multi-structure filtration device of claim 2, wherein the second washing module includes:
    a washing water supply pipe connected to and configured to supply washing water into the filtration device unit;
    a washing water supply pump configured to supply double-filtered clean water in the filtration device unit into the washing water supply pipe as the washing water;
    a washing nozzle configured to wash the second filter by receiving the washing water from the washing water supply pipe and spraying the washing water from the second space toward the first space;
    the discharging module is provided in the first space and configured to discharge moisture from a mixture of the foreign substances of the second filter and the washing water sprayed from the washing nozzle, and a filtered water outlet hole formed in the second space and configured to discharge filtered water that completes filtration through the first filter and the second filter and is accommodated in the second space, wherein the multi-structure filtration device is configured to discharge the foreign substances to the outside of the filtration tank through the discharge module.

4. The multi-structure filtration device of claim 3, wherein the discharge module includes:

a water outlet hole formed at one end of the filtration device unit;

a check valve type water outlet unit provided to open and close the water outlet hole, and a water outlet pipe that is connected to the check valve type water outlet unit and is configured to discharge water coming through the check valve type water outlet unit to the outside of the filtration tank, the check valve type water outlet unit is configured to control the flow of the filtration target fluid in one direction to prevent the filtration target fluid filled in the filtration tank from flowing back into the second space.

5. The multi-structure filtration device of claim 1, wherein the multi-structure filtration device further comprises: a foreign substance receiving unit configured to separate and remove large solids and non-decomposable substances separated and removed from the first filter in a dehydrated state, and a dehydration support unit configured to transfer dehydration liquid, which is obtained from the foreign substances attached to the first filter, to the filtration tank, wherein the dehydration support unit is provided under the dehydration roller, and the dehydration liquid falls and moves to the dehydration support unit by gravity, wherein the foreign substance receiving unit is a drawer-type container that is slidably installed on an upper part of a storage space configured to be inserted and pulled out, and the foreign substances dehydrated by the dehydration roller naturally falls and moves to the foreign substance receiving unit by gravity.

* * * * *